United States Patent [19]
Eick et al.

[11] Patent Number: 5,564,048
[45] Date of Patent: Oct. 8, 1996

[54] OBJECT-ORIENTED FUNCTIONALITY CLASS LIBRARY FOR USE IN GRAPHICS PROGRAMMING

[75] Inventors: Stephen G. Eick; Paul J. Lucas, both of Naperville; Graham J. Wills, Lisle, all of Ill.

[73] Assignee: Lucent Technologies Inc., Murray Hill, N.J.

[21] Appl. No.: 260,133

[22] Filed: Jun. 15, 1994

[51] Int. Cl.⁶ .................................................. G06F 17/30
[52] U.S. Cl. .................... 395/600; 395/700; 395/155; 395/156; 395/157; 364/282.3; 364/674; 364/977.2; 364/DIG. 2
[58] Field of Search ................................. 395/600, 700, 395/375, 650, 155, 156, 157, 158, 159, 160, 161

[56] References Cited

U.S. PATENT DOCUMENTS

| | | | |
|---|---|---|---|
| 5,220,500 | 6/1993 | Baird et al. ........................... | 364/408 |
| 5,379,432 | 1/1995 | Orton et al. ........................... | 395/700 |
| 5,404,529 | 4/1995 | Chernikoff et al. ................... | 345/700 |
| 5,446,902 | 8/1995 | Islam ..................................... | 395/700 |

FOREIGN PATENT DOCUMENTS 2661525   10/1991   France .

OTHER PUBLICATIONS

Anonymous, "The World of O-O", *Computer Conference Analysis Newsletter*, No. 296, Mar. 17, 1992, p. 4.
Korson et al., "Understanding Object-Oriented: a Unifying Paradigm", *Communications of the ACM*, vol. 33, No. 9, Sep., 1990, pp. 40-60.
Offerman et al., "Objects to the Rescue", *Personal Workstation*, vol. 3, No. 6, Jun., 1991, pp. 50-53.
Emily Leinfuss, "Managing Class Libraries Takes Discipline", *Software Magazine*, vol. 13, No. 2, Jan. 15, 1993, pp. 15-19.
Allen Holub, "Visual C++: Its Compiler, Language Implementation and Code Quality", *Microsoft Systems Journal*, vol. 8, No. 6, Jun., 1993, pp. 65-75.
Steve Mann, "The Beta Programming Language: an O-O Language With Simula Roots", *Dr. Doob's Journal*, vol. 18, No. 11, Oct., 1993, pp. 56-63.
Ted Faison, "Putting the Owl 2.0 Class Library for Windows Through Its Paces", *Microsoft Systems Journal*, vol. 9, No. 2, Feb., 1994, pp. 45-62.
"Class Libraries for user interface managment", Gonzalez, R. E., *Collegiate Microcomputer*, Nov. 1992, USA, vol. 10. No. 4, ISSN 0731-4213, pp. 233-238.
"Zinc Interface Library", Entsminger, G., *Computer Language*, Dec. 1990, USA, vol. 7, No. 12, ISSN 0749-2839, pp. 73-74, 76.

*Primary Examiner*—Thomas G. Black
*Assistant Examiner*—Paul R. Lintz
*Attorney, Agent, or Firm*—Gordon E. Nelson

[57] ABSTRACT

A library of C++ classes for use in writing data visualization programs. The library embodies a general design principle for class libraries: that the classes are partitioned into entity classes and functionality classes. Entity classes in the library specify properties of areas in a display and the functionality classes specify functionalities which the areas may have, for example, being responsive to the mouse or the keyboard or being capable of executing drawing commands. The classes are narrowly defined, and when the C++ programmer specifies a class for an object, he or she can give the object exactly the desired properties by selecting from among the area classes and the functionality classes. Because properties are acquired by inheritance, code generated using the libraries is shorter and faster than code generated using conventional class libraries.

12 Claims, 5 Drawing Sheets

FIG. 6A

```
                    Float (toy) - a text bowser

Graham J. Wills (gwills@research.att.com)

Copyright AT&T. All rights reserved include <string.h>
        #include <stream.h> include <avector.h>          // Intelligent vectors
        #include <charstar.h>         // Intelligent strings include <vz/app.h>    603  ⎫   // Main window and initialization
        #include <vz/drawa.h>  605  ⎬611 // An area for drawing into
        #include <vz/drawer.h> 607  ⎪   // Drawing code
        #include <vz/mouse.h>  609  ⎭   // Mouse handling static VzColor BACK, DRAWC, HIGHC;    // Colors class FloatDraw : public VzDrawingArea,  ⎫
                          public VzDrawer,       ⎬613
                          public VzMouseable {   ⎭
          public:

FloatDraw(VzNativeObject w)             // Parent Object is this  ⎫
                : VzDrawingArea("Float", w),        // This is a drawing area ⎬615
                  VzMouseable(VzAll),               // Want all mouse motions ⎪
                  VzFunctionality(this)             // Annoying C++ requirement⎭
            { }

601         void ReadFile(char *name, char *match);    // Do file match  617

// All drawing areas must be able to draw themselves
            virtual void DoExpose( int l, int t, int w, int h );   619

// All mouseables must be able to handle clicks
            virtual void DoMouse( VzMouseActions, int, VzNativeEvent const* );  621 private:
            AutoVector<CharString> ln;    // Lines of text
            AutoVector<short> lnlen;      // Their lengths
            AutoVector<char> lnmat;       // A match?
            int  maxlen;                   // Maximum length
            int  cWid;                     // Width of each column
```

FIG. 6B

```
            Reads file and performs matching
        void FloatDraw::ReadFile(char *name, char *match)
        {
            ifstream fl(name);

int maxlen = 0;
            char buffer[9900];
            for(int lines = 0; fl.getline(buffer, 9000); lines ++)
            {                                                                       ⎫
                ln[lines] = *buffer ? buffer : " ";    // Blank lines become " "    ⎬623 lnlen[lines] = MeasureString(buffer);   // Width in pixels
                if (lnlen[lines] > maxlen) maxlen = lnlen[lines];
                lnmat[lines] = (char) (strstr(buffer, match) != 0);
            }
        } void FloatDraw::DoExpose(int,int,int,int)
        {
            int ht = Height()-20;
            cWid = (Width()-20 + 2)/(1 + ln.Count()/ht) - 5;
            if (cWid < 3) cWid = 3;

int x = 10, y = 10;                                                     ⎫
            for (int i=0; i<ln.Count(); i++, y++)                                   ⎬625
            {
                if ( i && !(i%ht)) {
                    x += 5+cWid;
                    y = 10;
                }
                ForeColor(lnmat[i] ? HIGHC : DRAWC);    // Choose appropriate color
                DrawLine( x, y,
                          x+cWid*lnlen[i]/maxlen, y);
```

FIG. 6C

```
void FloatDraw::DoMouse(VzMouseActions what, int which, VzNativeEvent const*)
{
    int wid = Width()-20;
    int ht = Height()-20;

int x = MouseX() - 10, y = MouseY() - 10;

ForeColor(EraseOver);                   // Erase in overlay layer
    FillRect(0, 0, Width(), Height());

if (x < 0 || y < 0) return;             // Mouse outside area
    if (x > wid || y > ht) return;

int st = x/(cWid+5) * ht + y-5;         // Get start and end lines
    int en = x/(cWid+5) * ht + y+5;         //    to be drawn
    if (st < 0) st = 0;
    if (en >= ln.Count()) en = ln.Count()-1;

int proceed = (which==1);               // Shall we draw?
    int maxl = lnlen[en];                   // Max length for shown lines
    for (int i=st; i<en; ++i) {
        if (lnlen[i] > maxl) maxl = lnlen[i];
        if (lnmat[i]) proceed = 1;          // Always draw if match
    }
    if (!proceed) return;

y = y+15 - 6*(en-st);                   // Calculate drawing position
    if (y + 12*(en-st) > Height()-10) y = Height()-10-12*(en-st);
    x = x+10 - maxl/2;
    if (x+maxl > Width()-10) x = Width() - maxl - 20;
    if (x<1) x = 1;

ForeColor(DrawOver);                    // Draw text into overlay
    for (i=st; i<=en; ++i) {
        DrawString(x, y, (const char *) ln[i]);
        y += 12;
```

```
main(int argc, char **argv)

VzApplication app("Float", &argc, argv); 631  // Start up application
FloatDraw draw(app.primeObject);         633  // Put "draw" in main window
draw.ReadFile(argv[2], argv[1]);         634  // Read the data VzColor cols;                                 // Allocate colors
draw.AllocColors(3, &cols, TRUE) != 3 )

draw.MapColor(BACK=cols++, "Black");          // Define colors
draw.MapColor(DRAWC=cols++, "Grey20");   635
draw.MapColor(HIGHC=cols, "Blue");
draw.MapAllOverlays("White");
draw.BackColor(BACK);

return app.Go();  639                         // GO!
```

} 629

OBJECT-ORIENTED FUNCTIONALITY CLASS LIBRARY FOR USE IN GRAPHICS PROGRAMMING

BACKGROUND OF THE INVENTION

1. Field of the Invention

The invention concerns object-oriented programming systems generally and more particularly concerns libraries for use in object-oriented graphics programming.

2. Description of the Prior Art

Graphical user interfaces have made computer systems far easier to use. In a typical graphical user interface, the display is divided into one or more windows. Each window corresponds to an activity being carried on by the user of the system, and the user can manipulate the windows and theft contents by means of a pointing device such as a mouse and/or the keyboard. A system with a graphical user interface is easier to use than a system with the old command-line interface because there is no need for the user to remember commands and file names and type them in or to remember the context in which he is working. Instead, the entire context is visible in the display, and the user simply uses his pointing device to select items on the display and thereby to specify the desired operation.

An important class of graphical user interfaces is graphical user interfaces used to visualize data. For example, a program may permit the user to investigate how one or more sets of statistics are associated with states in the United States. The graphical user interface for the program consists of a map of the United States and a selector bar in which values of a statistic are mapped to colors. When the mouse is used to select an area of the selector bar, the states for which the statistic is in the selected range(s) take on the color corresponding to the value of the statistic for the state. Such a graphical user interface is disclosed in S. G. Eick, J. L. Steffan and E. E. Sumner Jr. "Seesoft—A Tool For Visualizing Line Oriented Software Statistics", *IEEE Transactions On Software Engineering,* vol. 18 #11, November 1992

While a graphical user interface is easier to use than the old command-line interface, programs with graphical user interfaces are far larger and more complex than programs written for the old command-line interface. Developing programs with graphical user interfaces thus takes longer, the programs require more storage space, and fast execution requires a more powerful processor.

Computer scientists have dealt with the problems of programming for the graphical user interface in two ways: by developing libraries of components of graphical user interface programs and by using object-oriented programming systems to write graphical user interface programs. When a library of components is available, the programmer can use components from the library in his program, and thus avoid having to write and debug them himself. An example of such a library of components is the X Window Tool Kit, which is part of the the X Window System, produced by the X Consortium ( X Window System is a Trademark of the Massachusetts Institute of Technology). The system is described in O. Jones, *Introduction to the X Window System* Prentice Hall, 1989

Object-oriented programming systems employ programming languages which permit the definition of objects. An object is simply an entity which is manipulated by the program. Each object has a class, which defines all of the operations which are permitted on the object. There are objects with built-in classes and objects whose classes are defined by the programmer. For example, an integer variable is an object with the built-in integer class. The operations of the integer class include addition, subtraction, multiplication and the modulus operation, but not division, since division may not have an integer result. The programmer may define his own classes in terms of the built-in classes and other previously-defined classes.

In defining a class, the programmer specifies how each of the operations for the class is to be performed. For example, a programmer may define a class whose objects are windows. Operations for objects having such a class may include making and destroying the window, exposing the window on the display, resizing the window, and clearing the window, and the programmer must specify how each of these operations is to be performed.

Object-oriented programming systems provide two important advantages: first, the entities which the program manipulates (for example, windows) appear directly in the program, so the program is both easier to write and easier to understand. Second, the class definitions permit the programming system to detect many programming errors which would otherwise only come to light when the program malfunctioned. An example of such an object-oriented programming system is the C++ language and compiler, as described in Stanley B. Lippman, *C++ Primer,* 2nd edition, Addison-Wesley Publishing Co., Reading, Mass., 1991.

Of course, libraries may be used in object-oriented programming systems. Existing libraries such as the X Window Tool Kit mentioned above may be adapted for use in object-oriented programming systems and C++ libraries for programming graphical user interfaces have also been developed. A commercially-available example of such a library is the the XVT Portability Toolkit from XVT Software Inc.

Existing libraries for programming graphical user interfaces are useful, but have a number of difficulties. First, they provide the programmer with a collection of predefined classes, rather than permitting the programmer to define his own classes. Second, because the classes are predefined, they must be general purpose. Each class must have many operations and a given operation must deal with many situations. As a result, the classes are hard for the programmer to understand, the code for the operations is long and complex, and execution is relatively slow. Third, as complex as the operations are, they often still do not exactly fit what the programmer wants to do, and only limited tailoring is possible. This drawback is particularly important when the programmer is designing truly new graphical user interfaces, such as those used in data visualization, instead of implementing variations on existing graphical user interfaces. Fourth, libraries and programming tools are generally provided as packages, and consequently, different libraries and tool sets are frequently incompatible. Finally, none of the existing libraries is well adapted to producing graphical user interfaces for visualizing data.

It is an object of the invention disclosed herein to provide a solution to these and other difficulties of existing libraries for programming graphical user interfaces.

SUMMARY OF THE INVENTION

The invention solves the foregoing problems by means of a library of C++ classes called Vz. The classes in the library fall into two categories: area classes, which specify a kind of area of the display, and functionality classes, which specify functionalities which may be added to an object having one of the area classes. Any user-defined class which inherits one of the library's area classes may also inherit any of the library's functionality classes. Each functionality class specifies only a small set of closely-related functionalities. Consequently, the properties of an object representing a display area such as a window may be precisely defined by inheriting only those classes which specify the needed functionalities.

For example, one of the area classes provided by Vz is is VzDrawingArea, which defines a window for which no kind of content has yet been defined. One of the functionality classes is VzMouseable, which provides the functionality of responding to mouse inputs. An object which has a class that has inherited both VzDrawingArea and VzMouseable would thus represent a window which was responsive to mouse inputs.

As is apparent from the foregoing, the division of the classes in the Vz library into area classes and narrowly-defined functionality classes and the use of inheritance to define object classes permits objects to be precisely defined for the task at hand. Only those functionalities that are needed need be inherited, and changes in functionalities can be accomplished simply by changing the inheritance.

The combination of narrowly-defined functionality classes and inheritance is further easier to understand than the complexities of prior-art library classes. Moreover, the code for the object will include only the coder required for the object's inherited area classes and functionality classes, and will thus generally be smaller and execute more quickly than that of objects made using classes from prior-an library systems. Finally, the classes of the library may be inherited along with classes defining objects used in particular graphical user interfaces, and consequently, there are no compatibility problems like those with prior-an libraries.

The approach described above for graphics libraries may be generalized. Class libraries for any programming area may be divided into entity classes which specify the kinds of entities represented by the objects and functionality classes specifying functionalities which may be provided to the entities. The kinds of entities and the functionalities will of course depend on the application area.

The foregoing and other objects and advantages of the invention will be apparent to one of ordinary skill in the art who peruses the following Drawing and Detailed Description, wherein:

BRIEF DESCRIPTION OF THE DRAWING

FIG. 6A is a portion of the code of the example program;

FIG. 6B is another portion of the code of the example program;

FIG. 6C is a third portion of the code of the example program; and

FIG. 6D is a fourth portion of the code of the example program.

Figure 1:
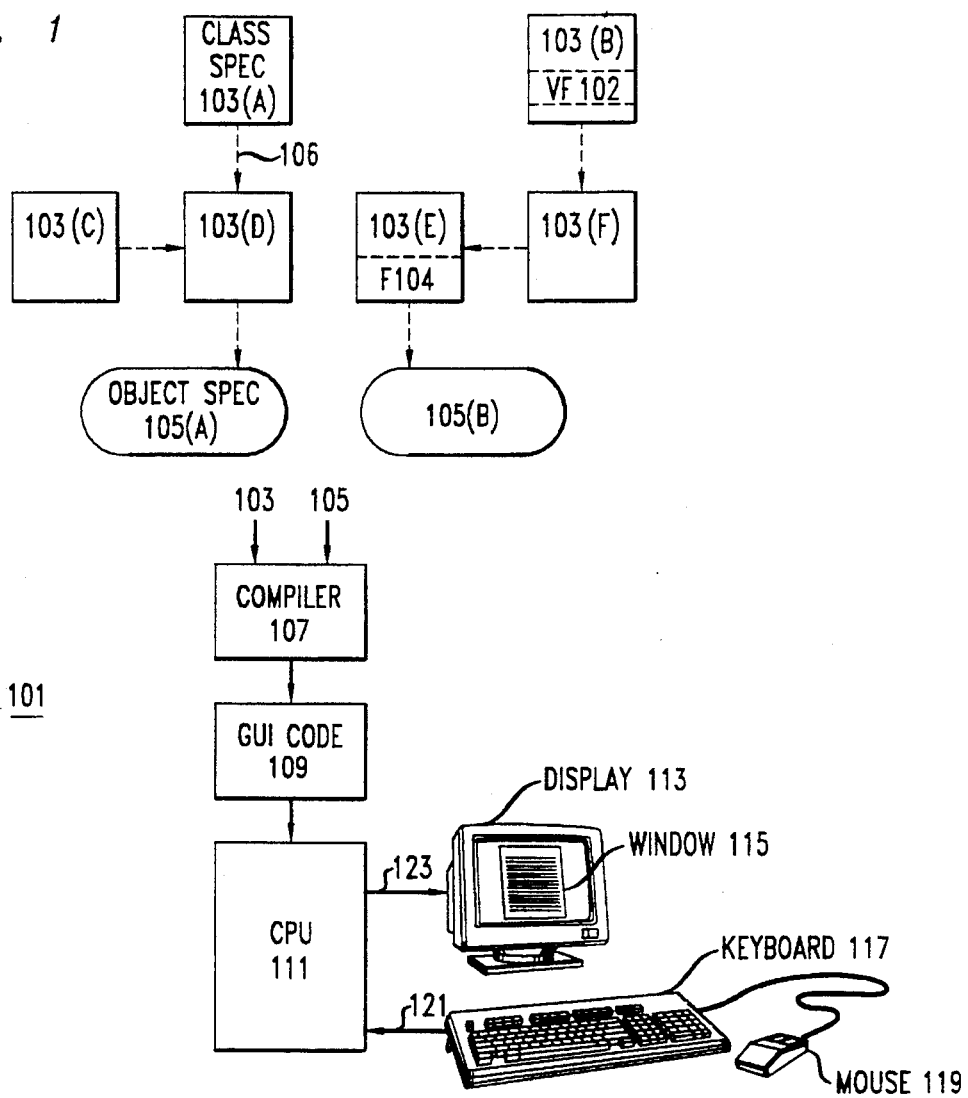
FIG. 1 is a block diagram of an object-oriented programming system.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description will begin with an overview of object-oriented programming systems generally, will then provide an overview of the principles of the invention and of the Vz library and an example of how classes from the library may be used in writing a graphics program, and will conclude with detailed descriptions of the library's classes.
Object-Oriented Programming Systems: FIG. 1

FIG. 1 is a block diagram of an object-oriented programming system 101 being used to produce code for a graphical user interface. Object-oriented programming system 101 includes a compiler 107 for an object-oriented programming language which produces object code 109 for CPU 111. When CPU 111 executes code 109, the execution results in outputs 123 to display 113. In response to these outputs, display 113 produces window 115. A user of CPU 111 may employ keyboard 117 and/or mouse 119 to provide inputs to window 115. As shown by arrow 121, these inputs go to CPU 111, where they affect the execution of code 109, and consequently may result in changes to window 115. The execution of code 109 may thus be interactive, that is, a user responds to the contents of window 115 with an input from keyboard 117 or mouse 119, which in turn changes the appearance of window 115. The change may of course result in a further input from the user. In a preferred embodiment, the object-oriented programming language is C++, compiler 107 is the Unix Software Laboratories (USL) C++ compiler, running on an Iris Indigo (Silicon Graphics Inc.) with 64 MBytes memory, system software version 5.2. The code generated by the compiler is for the above Silicon Graphics system.

Because compiler 107 is a compiler for an object-oriented language, the source code from which compiler 107 produces code 109 contains object specifications 105 and class specifications 103, as shown by the arrows 103 and 105 indicating inputs to compiler 107. Every object must have a class, and consequently, each object specification 105 must include a reference to a class specification 103. Class specifications 103 may in turn be defined in terms of one or more other classes. The class defined by a given class specification 103 is said to inherit the classes used in its class specification 103. A class which does not inherit any other class is termed a base class.

The above relationships are represented in FIG. 1 by the dotted arrows 106 connecting class specifications 103 and class specifications 103 to object specifications 105. Thus, class specification 103(d), which specifies the class of the object specified by object specification 105(a), inherits the classes specified by class specifications 103(c) and 103(a). Both of these class specifications specify base classes. Inheritance may of course go back more than one "generation". Thus specification 105(b)'s class specification 103(e) may inherit the class defined by class specification 103(f), which in turn inherits the class defined by specification 103(b). Here, class specification 103(b) specifies a base class.

As already mentioned, an object's class determines what operations can be performed on the object. The operations themselves are specified by means of function specifications in the class specifications 103. In C++, there are two kinds of function specifications: virtual function specifications 102 and ordinary function specifications 104. An ordinary function specification 104 specifies an interface for the operation and also contains code for doing the operation. A virtual function specification only specifies the interface. Code for doing the operation must be provided in a separate ordinary function 104, and different class specifications 103 which inherit a class having a virtual function may have different ordinary functions 104 for the virtual function. The only requirement is that all of the ordinary functions 104 have the interface specified for the virtual function 102. If there is an ordinary function 104 for a virtual function 102 in the class specification which defines the virtual function, the ordinary function 104 is a default. If another class inherits the class with the virtual function and does not have its own ordinary function 104 for the virtual function, it inherits the default ordinary function. The virtual function thus permits the programmer to define operations of an inherited class as required for a particular application of the class.

An example of the above is provided by the Vz library's class VzMouseable, which includes a virtual function DoMouse. The virtual function interface defines how information concerning the behavior of the mouse is passed to code 109, but does not define what action is taken in response to the information. A class which inherits VzMouseable must provide an ordinary function 104 for DoMouse. For example, the ordinary function 104 might provide that if the mouse is used to select a portion of the text on display in a window, the selected portion is highlighted in the display and saved for use in a later operation such as moving or deleting the text.

Figure 2:
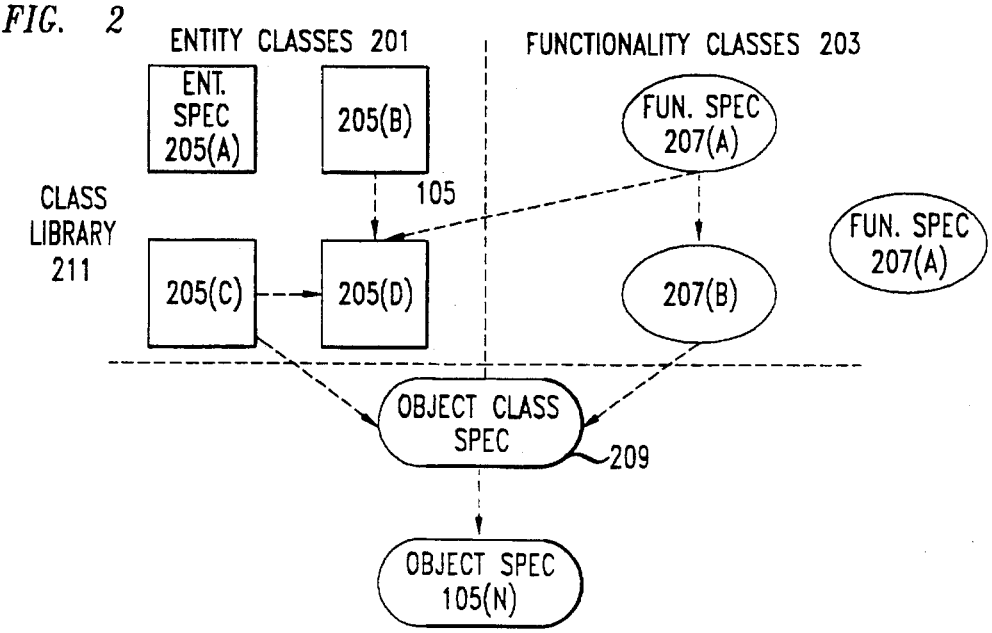
FIG. 2 is a block diagram of how a library made according to the techniques of the invention may be used to specify an object's class.

A Class Library Organized According to the Invention: FIG. 2

As mentioned above, many of the class specifications 103 in an object-oriented programming system 101 may be provided by a class library. FIG. 2 is a diagram of a class library 211 organized according to the principles of the present invention. Class library 201 includes two kinds of class specifiers: those for entity classes 201 and those for functionality classes 203. The class specifiers for entity classes 201 define classes which specify the object as a thing, for example, a window 115 which has a certain form and kind of content. An example of such an entity class in the Vz library is VzDrawingArea, which is a class for a window whose kind of content is as yet unspecified. (The kind of content can be added by inheriting another entity class which inherits VzDrawingArea.) The class specifier 205 for that class includes virtual functions 102 for actions to be taken in response to an expose or resize event involving the window and ordinary functions 104 for actions to be taken when the window itself is created, destroyed, exposed, or resized.

The class specifiers 207 for functionality classes 203 define functionalities which may be provided to the entities defined by the entity classes 201. For example, in Vz, the functionality class VzMouseable provides the functionality of responding to a mouse. Thus, using the principles of class library 211, the class of an object which represented a window 115 that had to respond to input from a mouse could be defined by inheriting VzDrawingArea and VzMouseable. Of course, the class for the object would have to provide ordinary functions 104 for any virtual functions 102 for which no ordinary functions 104 had been inherited or for which different ordinary functions were required.

The dotted lines 105 in FIG. 2 show how the inheritance works. Object class specification 209 defines the class of the object specified in object specification 105(n). Class specification 209 inherits entity class 205(c) and functionality class 207(b) from class library 211. In the class library of the preferred embodiment, an object class specification 209 which inherits from any of the entity classes 201 defined by class library 211 can inherit any and any number of the functionality classes 203 defined by class library 211.

As the dotted lines show, inheritance is also used to define classes within class library 211. Entity class 205(d) inherits both the class specified by entity class specifier 205(b) and the class specified by functionality class specifier 207(a), that is, the entity class specified by functionality class specifer 205(d) has the functionality specified by functionality class specifer 207(a). Similarly, the lo functionality class specified by functionality class specifier 207(b) inherits the functionality class specified by specifier 207(a) and includes all the functionality defined for both classes.

Figure 3:
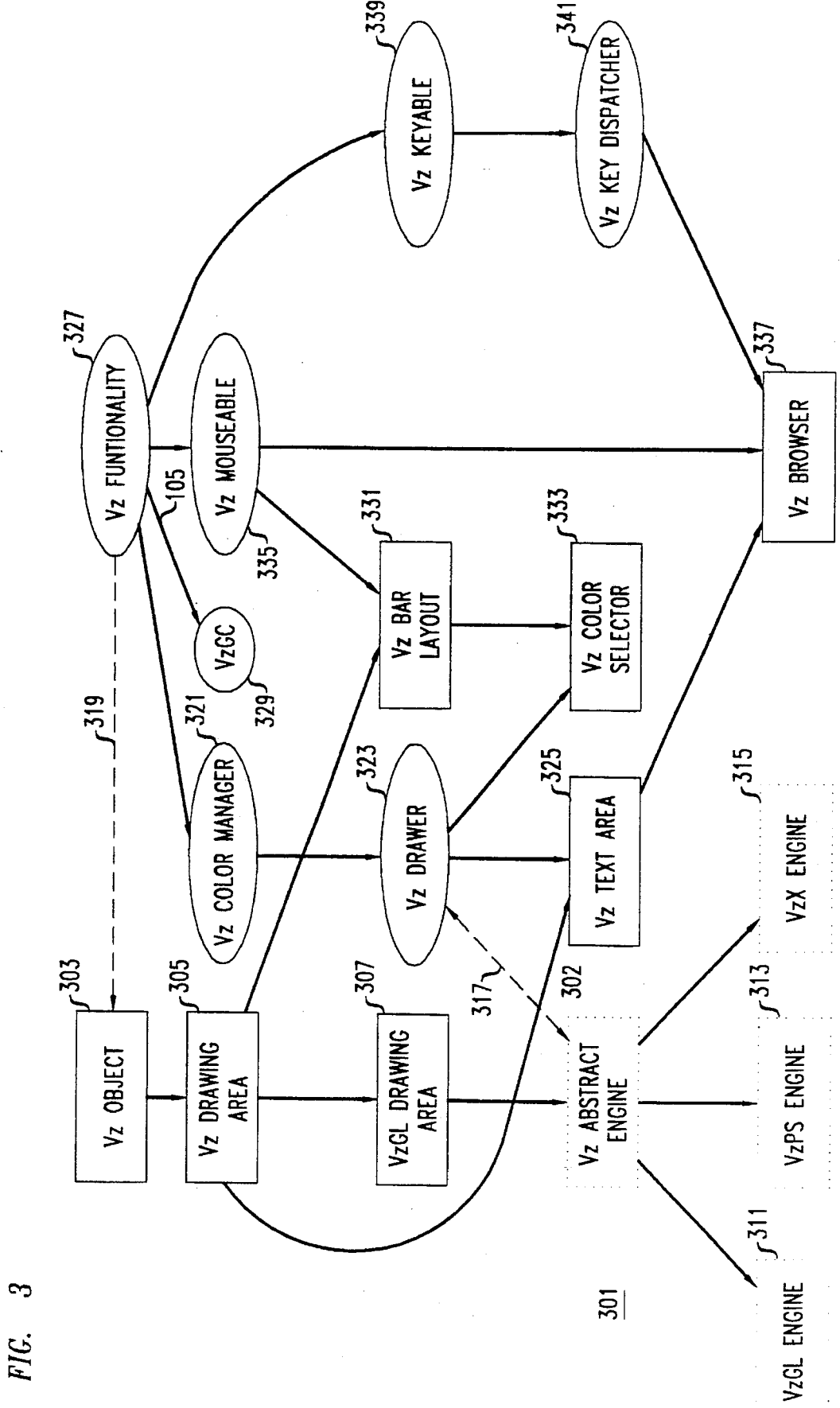
FIG. 3 is a diagram of the classes of the Vz library and their relationships to each other.

An Example Class Library 211: FIG. 3

In a preferred embodiment, the principles of class library 211 are embodied in the Vz class library for data visualization. FIG. 3 shows the classes of Vz library 301 and their relationship to each other. Area Classes indicated by solid-line rectangles 304 are entity classes 201; each of these classes specifies that an object which inherits the class represents a particular kind of window 115; classes indicated by ovals are functionality classes 203; each of these classes specifies a functionality in an object whose class inherits the functionality class and one of the area classes. The classes indicated by dotted rectangles 302 are graphics engine classes which define objects representing graphics engines. As indicated by dashed arrow 317, the graphics engines actually perform the operations specified by VzDrawer functionality class 323.

In the following, each of the classes of library 301 will be described in overview, beginning with VzFunctionality class 327 and those functionality classes 306 which inherit from it. A detailed description of each class may be found at the end of the present application.

Functionality Classers 306

The class at the top of the hierarchy of functionality classes 306 is VzFunctionality 327. The class specifies a data member which is a pointer to an object whose class has inherited a functionality class 306. The constructor for the class sets the pointer, and there is a function which checks whether there actually is such an object. This class is inherited by all of the functionality classes.

Continuing with VzColorManager 321, this functionality class specifies the functionality needed to control the use of colors in an area of a display 113. Operations added by this class include allocating colors, mapping colors to a scale of values, overlaying colors, turning colors off and on, and establishing foreground and background colors.

VzColorManager 321 is in turn inherited by VzDrawer 323, a functionality class which gives an area object the ability to respond to drawing commands. Added operations include outputting the area as a Postscript file, doing double buffering, convening between coordinate systems, specifying fonts and measuring the size of strings, and doing drawing operations such as drawing points, lines, rectangles, ovals, polygons, filling polygons, and the like.

VzGC 321 is a class which gives an area object the ability to specify a graphics context of the kind required by the graphics system which provides the graphics primitives for program 109. The class essentially serves to "wrap" a class from library 301 around a graphics context object provided by the graphics system.

VzMouseable 335 is a class which provides an area object with the ability to respond to input from a mouse. The constructor establishes which types of mouse input will cause the methods of this class to be called, such as mouse clicking only, or clicking and dragging or all mouse motion. There are operations for getting and setting which types of mouse input will trigger a response, and there is a virtual call back function for specifying how the area object is to respond to input from the mouse.

VzKeyable 339 is a class which provides an area object with the ability to respond to input from the keyboard. The constructor establishes a data structure for storing keyboard state, there are added operations for getting and setting the keyboard state, and there is a virtual call back function for specifying how the area object is to respond to input from the keyboard.

The last functionality class 306 is VzKeyDispatcher 341, which inherits VzKeyable 339. This class provides an area object with the ability to define how it responds to input from the keyboard. Keys may be mapped to ordinary functions 104, and when a key is depressed, the function 104 to which it is mapped is executed. The constructor makes a map, and other added operations include mapping keys to functions and saving and restoring keymaps. One use for this functionality class is to permit a user to edit text in a window using the keystrokes for the user's favorite text editor.

Area Classes 304

The area classes define operations on areas such as windows, sliders, buttons, menus, and so on in display 113. In many graphical user interface systems, these areas are represented by native objects provided by the graphical user interface system. For example, if the underlying system is the X Window System, then the native objects will be X Window widgets. A native object is made to behave like an object which inherits the area classes of the Vz library by "wrapping" an object which does inherit the area classes around the native object. Such objects are termed herein Vz objects.

The base class for the area classes is VzObject class 303. Class 303 permits a Vz object which inherits the class to be wrapped around a native object. Data for the class is a pointer to the native object. Operations include the following:

allocation and deletion operations for both creating a Vz object by itself and creating a native object and wrapping the Vz object around it and deleting the Vz object and any native object it is wrapped around;

Operations which return pointers to the Vz object and the native object,

Operations which return information about the object hierarchy to which the native object belongs;

Operations which get and set the dimensions of the area represented by the native object; and Functions which create and destroy Vz objects and call backs for window creation and destruction events.

As indicated by dotted arrow 319, any class which inherits VzObject 303 may inherit any functionality class 306, that is, any class which inherits VzFunctionality 327.

The next class in the hierarchy of area classes 304 is VzDrawingArea 305. An object with such a class 305 represents an area into which a program may draw. Operations added by the class to those of VzObject include constructors which creates a new VzDrawingarea object or wraps such an object around an existing native object, virtual functions for expose and resize events, and operations for clearing and exposing the drawing area. As may be seen from the foregoing, the class has no operations which specify what is to appear in the drawing area.

VzDrawingArea 305 is inherited either directly or indirectly by all of the remaining area classes 306. Beginning with VzTextArea 325, this class is inherited by object classes where the object represents an area of display 113 which contains text. The added operations provided by the class permit the text to be optionally scrolled, to be highlighted, and to be drawn in different fonts and colors. The functionality for doing these operations is provided by VzDrawer 323, which is also inherited by VzTextArea. Continuing in more detail with the operations, the class constructor includes arguments for specifying scrolling and the left margin. Other operations include operations for assigning up to 16 fonts to the area, for specifying the text to be displayed in the window and returning a pointer to the text, for positioning the text in the window, for highlighting lines, and for returning information about the displayed text. The information includes the number of lines in the text, the number of lines being displayed, the number of the top and bottom lines being displayed, whether a given line is being displayed, and the height of a given line. Also provided is an iteration function which iterates over the lines of the text for the object.

VzTextArea is itself inherited by VzBRowser 337, which also inherits from the functionality classes VzMouseable 335 and VzKeyDispatcher 341. As would be expected by these inheritances, VzBrowser is a class for objects representing areas which display text and permit the user to manipulate the displayed text using keyboard 117 and mouse 119. The added operations include moving around int he text, searching the text, setting marks at various lines, and jumping to a marked line by selecting the text for the line from a pop-up menu. Since the class inherits VzKeyable, the effect of inputs from keyboard 117 can be redefined.

Continuing with VzGLDrawingArea 307, this area class is a class which has been specialized for the implementation of the Vz library which is used to generate programs which execute on Silicon Graphics computers. The only new operation is a constructor which provides the arguments needed to configure a native area object on a Silicon Graphics system.

VzBarlayout 331 also inherits the functionality class VzMouseable. The class is inherited by objects which represent a drawing area for drawing either rows or columns of bars and using the mouse to manipulate them in the manner disclosed in the-Eick reference cited above. The class is further inherited by the last area class, namely VzColorSelector 333, which also inherits from the functionality class VzDrawer 323. VzColorSelector 333 is a class which is inherited by objects which represent areas containing selectors of the type disclosed in the Eick reference. Operations include turning bars in the selector on and off and mapping ranges of colors to ranges of values.

The remaining classes are graphics engine classes 302, which include the operations provided by the underlying graphics systems. The base class here is VzAbstractEngine 309, which defines virtual functions for a set of high-level graphics operations. The classes which inherit VzAbstractEngine 309 provide implementations for these virtual functions for each of the underlying graphics systems for which Vz library 301 can be used to generate code. At present, there are three such underlying systems. Accordingly, VzGLEngine 311 implements the functions for the graphics systems used on SGI machines. VzPSEngine implements the functions in postscript, so that any object represented by one of the area classes 304 can be printed on a Postscript printer (Postscript is a trademark of Adobe Systems, Inc.) VzXEngine, finally, implements the functions in the X Window System.

Figure 4:
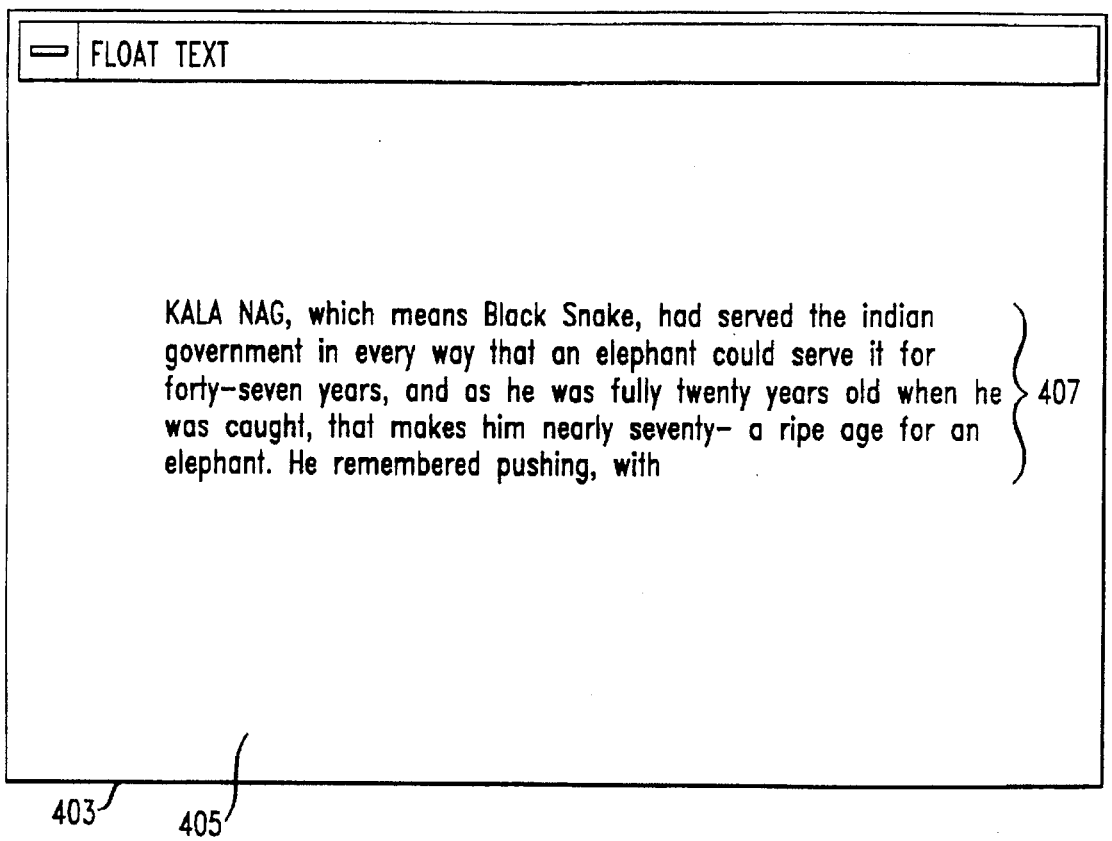
FIG. 4 is a window produced by an example program made using the library.
Figure 5:
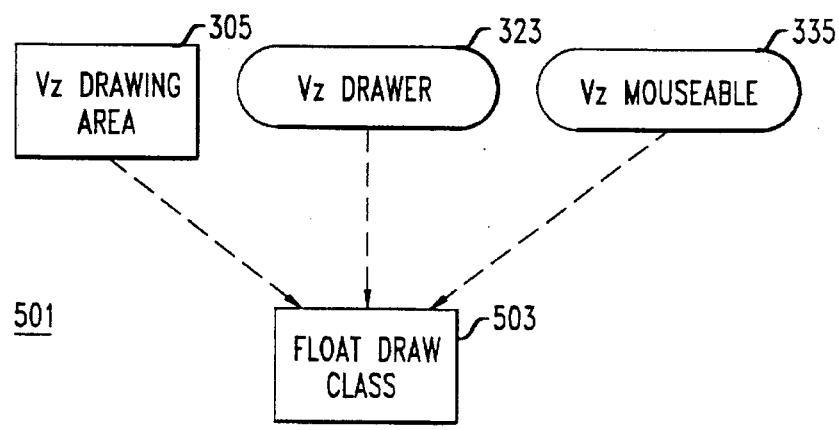
FIG. 5 is a block diagram of the class inheritance of the object which represents the window.

An Example Graphics Program which uses Vz 301: FIGS. 4-6

In the following, an example program called float, which uses the Vz library, will be explained in detail. float is a text browsing program; when the user executes the program, he specifies a file name and a search string. FIG. 4 shows a window 401 produced by executing float. Representations of the lines of the file 405 are arranged in columns 403, with the length of the line representation corresponding to the length of the line. When a line of the file contains the search string, the corresponding line representation 405 is highlighted. Details of this kind of display may be found in the Eick reference cited above. In order to see a portion of the text which contains the search string, the user employs a mouse to select an area of the line representations. If the area includes one of the highlighted line representations, The program responds to the selection by overlaying the display of the file with the lines of text from the selected area. The text appears to "float" above the display of the line representations; hence the name of the program.

Window 401 is represented in the program by an object with the class FloatDraw. FIG. 5 shows how classes of Vz library 301 are used in specifying FloatDraw 503. FloatDraw 403 inherits the library area class VzDrawingArea 305 and the library functionality classes VzDrawer 323 and VzMouseable 335. By virtue of the functionalities inherited from classes 323 and 335, the program may perform graphics operations on the window represented by an object of class FloatDraw 503 and will also respond to mouse inputs on the window.

FIGS. 6A, 6B, 6C, and 6D show the complete C++ source code 601 for the float program. Beginning at the top of FIG. 6A, the source text specifies a number of include files. Among these include files are include files 611 which contain source code for Vz library classes. Here, include file 603 contains source code for a class which is the class of an application program which uses objects having types inherited from Vz library 301. Include file 605 contains source code for VzDrawingArea class 305, include file 607 contains source code for VzDrawer 323, and include file 609 contains source code for VzMouseable 609.

At 613, there is seen the beginning of the specification for the FloatDraw class; the three classes 305, 323, and 325 which FloatDraw inherits from library 301 are listed following the semicolon after FloatDraw. Next, at 615 comes the specification of a constructor for objects of FloatDraw type 503; the argument (VzNativeObject w) is a pointer to a parent native object. When an object of class FloatDraw is created, a native object will be created which is a child of the parent native object and an object of class FloatDraw will be wrapped around the child native object. Further, since the object of class FloatDraw inherits from the classes named above, the constructor must include references to the constructors for those classes. Those constructors appear following the colon.

Objects of class FloatDraw 503 have three operations: reading a file to produce the information from which window 401 may be produced, drawing window 401, and responding to mouse selections of line representations 405. All of these operations are specified as virtual functions 102, the read operation as the ReadFile virtual function at 617, the drawing operation as the DoExpose function at 619, and the response to the mouse selections at DoMouse 621.

The ordinary functions 104 which implement these virtual functions 102 are found in FIGS. 6B and 6C. The implementation of ReadFile appears at 623 in FIG. 6B; the implementation takes pointers to the file name and search string as arguments and makes three arrays: one, ln, for the lines in the file, one, lnlen, for the length of each line, and one, lnmat, for an indication of whether a line contained a match for the search string. The resulting arrays thus contain the information necessary to produce window 401.

The display of columns 403 and line representations 405 is produced when window 401 is exposed by the implementation of DoExpose at 625 in FIG. 6B. The function determines the current size of the window and then uses the arrays produced by ReadFile to produce the display. A line representation 405 is drawn for each line; if there is a match in the line, the line representation 405 is highlighted; otherwise it is not.

The ordinary function which is executed in response to a selection of a highlighted line by responds to selection by the mouse is DoMouse at 627 in FIG. 6C. This function obtains the current mouse position in the window, erases an area in memory used for overlaying on a window, determines from the mouse position what line representations 405 were selected, checks whether any of them contains a match for the search text, and if it does, the text is drawn at the proper position in the overlay, thus causing it to be displayed as shown at 407 in FIG. 4. It should be pointed out here that DoExpose 625 and DoMouse 627 implement virtual functions in VzDrawingArea and VzMouseable respectively. Such implementations are required before the inherited classes can actually be used to define an object.

FIG. 6D contains the function main 629, whose execution causes window 401 to appear. At line 631, an object of class VzApplication is constructed. Objects of this class initialize a windowing environment for a program to be executed and then execute the program. Next, at line 633, an object draw of the FloatDraw class is constructed and wrapped around the native mode object which represents the main window. Then the function ReadFile 623 is executed at 634. At 635, functions are executed which allocate and define colors. These functions are part of the class definition of VzColorManager 321, which was of course inherited by the class VzDrawer 323 used to define the FloatDraw class. The last line of main, at 639, starts a main event loop which waits for and responds to movements of mouse 119.

DETAILED DESCRIPTIONS OF CLASSES IN LIBRARY 301

There follow detailed descriptions of the classes in library 301. The descriptions are arranged in alphabetical order by class name.

NAME

VzApplication—Class to handle application details

SYNOPSIS

```
#include <Vz/Application.h>
class VzAppStream:public ostrstream {
public:
    VzAppStream(int);          // Constructor
    void Show();               // Output message
};
extern VzAppStream vzout;      // To standard dialog
extern VzAppStream vzwarn;     // To warning dialog
extern VzAppStream vzerr;      // To error dialog
ostream& vzends(ostream &s);   // manipulator to display text
class VzApplication {
    friend class VzAppStream;
    public:
        const char*   name;    // Program name
```

SYNOPSIS

```
    const char*  resourceName;           // Resource name for
                                            program
    const VzNativeContext& context;      // Context infor-
                                            mation
    const VzNativeObject& primeObject;   // Base window
                                            object
    const VzNativeDisplay& display;      // What we're
                                            shown on
    // Takes the program name, &argc, argv, window size
    and list of prefs VzApplication(const char* progName,
    int*, char**, int wid = 400, int ht = 300, char **prefs =
    NULL);
    int Go();    // Run main loop
    // Get a resource, specify name and default value
    const char *GetResource(const char*, const char*
    def = NULL);
    // Cursor control
    void BusyCursor(int state);          // Change cursor to/from
                                            Busy
};
```

DESCRIPTION

A VzAppStream is a stream to which application messages can be sent. If it is possible, these messages will be displayed in a pop-up dialog box which will be created if necessary. If messages are sent to the stream before the dialog can be created, they will be sent to the standard output.

The stream vzout is intended for information to be displayed. The stream vzwarn is intended for warning messages. The stream vzerr is intended for error messages.

A VzApplication is a class which handles initialization of the windowing environment and runs the main event loop for the program. It provides the ability to get resource definitions (user preferences) from the appropriate source, cursor control and stores useful global values VzApplication Constructor VzApplication(const char* progName, int*, char, int wid=400, int ht=300, char prefs=NULL)

The constructor takes the program name as a first argument. This name will appear as the main window's title and as the name used for specifying native resources. &argc and argv should be passed as the second and third parameters. The native-specific command line arguments will be dealt with and removed from the argc, argv pair. The wid and ht arguments are defaults for the width and height of the main window. prefs is currently unused. At construction time, a main window is created for the program and public variables described below are initialized. It is an error to create more than one VzApplication object.

Utility Routines int Go()

This starts the main event loop and should be called as the last line of the main() routine. The program will not return from this call.

const char *GetResource(const char*, const char* def= NULL)

Call this with the first parameter being a resource name and the second parameter a default return value. The resource database is searched for the value of the specified resource (for the program with name name) and the value is returned. If no value is found, the second argument def is returned.

void BusyCursor(int state)

Calling this routine with state true changes the cursor to a 'busy' cursor (typically a watch). With state false it reverts to a normal cursor unless there have been more calls to BusyCursor to make the cursor busy than to make it non-busy.

Public Data Members const char* name

The program name as passed to the constructor const char* resourceName

The resource name, usually the same as the program name const VzNativeContext& context The 'application context' used by the native system to store application globals const VzNativeObject& primeObject The top level window created on construction. Generally used as a parent for other views const VzNativeDisplay& display The conceptual area in which windows are displayed by the native system

NAME

VzBarLayout—Specialized VzDrawingArea for drawing in bars

SYNOPSIS

```
#include <Vz/BLayout.h>
typedef u_long VzLayoutOptions;
class VzBarLayout:public VzDrawingArea, public VzMouseable{
public:
    // constructor
    VzBarLayout(char const *name, VzNativeObject parent,
        VzLayoutOptions, VzMouseActions, int bars, int
        threshold = 0
    );
    // drawing & highlighting
    void   DrawBar(int bar_no, int count = 0);
    int    HighlightBar() const;
    void   HighlightBar(int bar_no);
    void   HighlightBarAt(int coord);
    // number of bars
    int    BarCount() const;
    int    BarCount(int new_count);
    // size
    int    BarSize(int when_highlighted = 0) const;
    int    LayoutSize() const;
    // miscellany
    int    Threshold() const;
    int    Threshold(int new_threshold);
protected:
    // drawing
    enum        DrawMethod {draw_normal, highlight,
                    unhighlight};
    virtual void  DrawBar(int bar_no, DrawMethod, int reduced,
                    int left, int top, int width, int height, int count
                ) = 0;
    // mouse
    virtual void  DoBar(int bar_no, VzMouseActions, int button,
                    int count);
    int         MouseCoord() const;
    // conversion
    int         BarToCoord(int bar_no) const;
    int         CoordToBar(int);
    void        BarToRect(int bar_no, int when_highlighted,
                    int *left, int *top, int *width, int *height
                ) const;
    // options
    int         BarsInRows() const;
};
```

DESCRIPTION

VzBarLayout

A VzBarLayout is—a VzDrawingArea and a VzMouseable that is used to draw and track the mouse for either rows (horizontal) or columns (vertical) of bars. A layout maintains zero or one bars as the "highlighted" bar—the one that follows mouse movements. A layout maintains a threshold value. If the height (for rows) or width (for columns) of a bar falls below it, then the layout is said to be reduced. When so, only the highlighted bar is drawn at its full size.

Public Interface

Constructor

VzBarLayout( char const *name, VzNativeObject, VzLayoutOptions, VzMouseActions, int bars, int threshold=0)

Creates a VzBarLayout with the given name and parent. The VzLayoutOptions argument is the bitwise or of any of the following options with the obvious exception that both VzRows and VzColumns cannot be selected.

VzRows Selects a row layout.

VzColumns Selects a column layout. The label is only printed for the currently highlighted item. It is left-justified, centered, or right-justified depending on whether the mouse is within the left, middle, or right third of the width of the layout, respectively.

VzGaps Requests that gaps be placed in between bars. The size of the gap is the smaller of 20% of the size of a bar or 5 pixels. If the layout is reduced, the gaps are sacrificed.

VzFloating Performs bar size calculations in floating-point arithmetic. This means that the bars will always fill the overall size of the layout, but not all bars and gaps will appear exactly the same size. If this option is not selected, then all bars and gaps are exactly the same size, but they will not completely fill the layout if the bar+gap size does not divide evenly into the layout size.

VzContinuousHighlighting Ordinarily, DoBar() is only called once per bar for highlighting and unhighlighting, i.e., once the mouse moves onto a bar and it has been highlighted, the mouse can be moved, but DoBar() will not called to rehighlight the same bar more than once in succession. If this option is specified, then DoBar() will be called for every mouse motion even if the bar is the same. This allows "animation" to be done while the mouse if moving over the highlighted bar.

If VzDrag is selected, the layout guarantees that, for a dragging operation, all the bars the mouse passes over will be reported via DoBar(). Since VzDraw implies VzDown, DoBar() is never called for both events for the same bar.

Only if VzLeave is selected and the mouse leaves the borders of the layout, then is DoBar() is called with a negative bar index to indicate this.

The VzMouseActions options is passed through to VzMouseable.

void DrawBar( int bar_no, int count=0 )

Requests the specified bar to be redrawn. The count argument should indicate how many more DrawBar() requests are forthcoming.

int HighlightBar() const

Returns the index of the bar currently highlighted, if any, or a negative index if no bar is currently highlighted.

void HighlightBar( int bar_no)

Unhighlights the previously highlighted bar, if any, by calling DrawBar() with a DrawMethod of unhighlight and sets the highlighted bar to the given index but only if the index is in the range [0,BarCount()-1] by calling DrawBar() with a DrawMethod of highlight. The count argument is set to 1 for the unhighlighting only if a new bar will be highlighted.

void HighlightBarAt( int coord )

Calls HighlightBar() with the given coordinate mapped to a bar index.

int BarCount() const

Returns the number of bars.

int BarCount( int new_count )

Sets the number of bars to be the given count, calls DoResize(), and returns the previous number of bars.

Size int BarSize( int when_highlighted=0 ) const

Returns the height (for rows) or width (for columns) of a single bar. If the layout is currently reduced, and the when_highlighted argument is non-zero, then the value returned is equal to the threshold parameter.

int LayoutSize() const

Returns the total height (for rows) or width (for columns) of the entire layout.

Miscellaneous int Threshold() const

Returns the current value of the threshold parameter.

int Threshold( int new_threshold )

Sets the threshold parameter to the given value, calls ExposeMe(), and returns the previous threshold parameter.

Protected Interface

Drawing virtual void DrawBar( int bar_no, DrawMethod, int reduced, int left, int top, int width, int height, int count )=0

A pure virtual member-function. The derived class overrides this function to perform the drawing of bars. The given bar index is passed as well as the DrawMethod in which the layout wants the bar to be drawn. The DrawMethods are:

draw_normal Draw the bar normally.

highlight Draw the bar in a "highlighted" manor.

unhighlight Redraw the bar such that it returns to its "unhighlighted" appearance.

If the reduced argument is non-zero, the layout is currently reduced and there is insufficient room to draw the bar at its full size. The rectangle for the bar into which it should be drawn is passed. The size of the rectangle is always full-sized if the DrawMethod is highlight. The count argument indicates how many more DrawBar() requests are forthcoming.

Mouse virtual void DoBar( int bar_no, VzMouseActions, int button, int count )

This virtual function may be overridden by the derived class; the default action is to do nothing. It is called only when one of the selected VzMouseOptions occurs for a given bar index. The VzMouseActions argument passes which of the selected VzMouseOptions occurred. The bar index is negative only when the VzMouseActions argument is VzLeave. The count argument indicates how many more DoBar() requests are forthcoming.

int MouseCoord() const

Returns the most recent coordinate of the mouse: y for rows, x for columns.

Conversion int BarToCoord( int bar_no ) const

Returns the upper (for rows) or left (for columns) coordinate corresponding to the given bar index. No check is made to see if the bar index is in the range [0,BarCount()-1].

int CoordToBar( int ) const

Returns the bar index corresponding to the given mouse coordinate (y for rows or x for columns). No check is made to see if the resulting bar index is in the range [0,BarCount()-1].

void BarToRect( int bar_no, int when_highlighted, int *left, int *top, int *width, int *height ) const;

Computes and returns the rectangle for the given bar index. No check is made to see if the resulting bar index is in the range [0,BarCount()-1]. If the bars are currently being reduced, and the when_highlighted argument is non-zero, then the height (for rows) or width (for columns) is equal to the threshold parameter.

Options
int BarsInRows() const

Returns non-zero only if the bars are in rows.

FILES

Vz/Vz.h Contains various Vz types and enumerations.

NAME

VzBrowser—An object that browses lines of text

SYNOPSIS

```
#include <Vz/TextA.h>
class VzBrowser:public VzTextArea, protected VzMouseable,
protected VzKeyDispatcher < VzBrowser > {public:
        // constructor & destructor
        VzBrowser(char const *name, VzNativeObject parent);
        ~VzBrowser();
        // text
        void    Text(char const*, long char_count LONG_MAX);
        void    Text(Vector < char const* > const&);
        // text position
        VzBrowser& ShowLine(int line_no, int always_center = 0);
protected:
        void    DoKey(VzKeyActions, VzNativeEvent const*);
};
```

DESCRIPTION

VzBrowser

Public Interface

A VzBrowser is—a VzTextArea, a VzMouseable, and a VzKeyDispatcher that is used to browse lines of text. Additionally, the text can be bidirectionally searched and have marks set at various lines. All line-oriented vi and emacs Unix text editor keyboard commands are supported.

In addition to setting and going to marked lines the vi way, lines can be marked by clicking button 1 in the left margin. A lower-case letter in the range a–z will appear there and that line is then marked with that letter. Clicking button 2 in the left margin unmarks a line. When marking a line, the letter chosen is the first available letter. Marked lines can be jumped to by selecting the matching text from the menu popped-up with button 3.

Constructor and Destructor
VzBrowser( char const *name, VzNativeObject parent )

Creates a VzBrowser with the given name and parent native object. The default size for a browser is 80 columns× 24 rows.

~VzBrowser()

Nothing noteworthy.

Text
char const* Text( char const*, long char_count=LONG_MAX ) char const* Text( Vector<char const*> const& )

In addition to calling VzTextArea::Text(), this function also clears all text marks.

Text Position
VzBrowser& ShowLine( int ine_no, int always_center=0 )

In addition to calling VzTextArea::ShowLine(), this function also pops-up the shell the browser is a child of, if any, and highlights the line of text, unhighlighting any previously-highlighted line.

Protected Interface
void DoKey( VzKeyActions, VzNativeEvent const* )

Overrides VzKeyDispatcher::DoKey() to implement vi and emacs keyboard commands. It can be subsequently overridden by a derived class.

FILES Vz/Vz.h Contains various Vz types and enumerations.

NAME

VzColorManager—Manages color creation and specification

SYNOPSIS

```
#include <Vz/color.h>
class VzColorManager:virtual public VzFunctionality {
public:
// ---------------------------------
enum {DrawOver = -1, EraseOver = -2}; // to do
overlaying
// constructor
VzColorManager();
// For creating and defining mutable colors
static int      AllocColors(int count, int *first, int
                overlay = 0);
static void     MapColor(VzColor, int r, int g, int b, int
                gEq = -1);
static void     MapColor(VzColor, char const *name, int
                gEq = -1);
static void     MakeColorScale(VzColorOptions, int start, int
                count, double from = 0.0, double to = 1.0);
// For tolerant, immutable colors
static VzColor RequestColor(int r, int g, int b, int
gEq = -1);
static VzColor RequestColor(char const *name, int
gEq = -1);
// For overlays on our colors
static void     MapOverlay(VzColor, int r, int g, int b, int
                g = -1);
static void     MapOverlay(VzColor, char const *name, int
                g = -1);
static void     MapAllOverlays(int r, int g, int b, int g = -1);
static void     MapAllOverlays(char const *name, int
                g = -1);
static void     ColorOverlay(VzColor, int *r, int *g, int *b,
                int grey = 0);
// For fuming colors on and off
static void     MapOffColor(VzColor, int g, int b, int
                g = -1);
static void     MapOffColor(char const *name, int g = -1);
static VzColor ColorOn(VzColor, int on);
static VzColor ColorOn(VzColor);
// Setting colors in environment
VzColor    BackColor();    // <0 => none set
VzColor    BackColor(VzNativeGC, VzColor);
void       StoreBackColor(VzColor);
VzColor    ForeColor(VzNativeGC, VzColor);
// Getting information
static double ColorIntensity(Vzcolor);
static u_long Colorindex(VzColor);
u_long OverlayMask() const;
// Allow access to color map
VzNativeColorMap    ColorMap()    {return cmap;}
// To specify where we are
static void    InDisplay(VzNativeDisplay);
};
```

DESCRIPTION

VzColorManager

A VzColorManager is a VzFunctionality which adds the ability to define colors and color ranges and to create and use overlay layers. There are no virtual functions in this class which the user needs to define. The intended purpose is for other classes to inherit from this class and gain access to the color management routines.

Constructor

VzColorManager()

The contractor initializes the private data structures only.

Color Allocation Methods static int AllocColors( int count, int *first, int overlay=0 )

This method allocates a set of available colors for use only by the program (i.e. they are not shared with other programs). The routine attempts to allocate space for count colors. The indices for these colors are sequintioal, the first one being returned in *first If overlay is true, an overlay layer is allocated. The method returns the actual number of colors allocated.

Color Definition Methods static void MakeColorScale( VzColorOptions, int start, int count, double,double)

This method defines a range of color values of a type defined by the VzColorOptions parameter, starting at start and of size count. The last two parameters allow subsets of the scale to be defined.

static void MapColor( VzColor, int r, int g, int b, int gEq=-1 )

static void MapColor( VzColor, char const *name, int gEq=-1 )

These methods allocate single colors in the colormap.

Shared Color Requests static VzColor RequestColor( int r, int g, int b, int gEq=-1 )

static VzColor RequestColor( char const *name, int gEq=-1 )

These methods return the index of the shared color described by the arguments. If no such color exists, one is created.

Overlay Methods static void MapOverlay( VzColor, int r, int g, int b, int gEq=-1 )

static void MapOverlay( VzColor, char const *name, int gEq=-1)

static void MapAllOverlays( int r, int g, int b, int gEq=-1 )

static void MapAllOverlays( char const *name, int gEq=-1 )

These methods define the resulting color when the overlay color is drawn on a normal color. The latter two methods define one resulting color for all overlays (this is the normal situation)

Color Dimming Methods static void MapOffColor( VzColor, int g, int b, int gEq=-1 )

static void MapOffColor( char const *name, int gEq=-1 )

static VzColor ColorOn( VzColor, int on )

static VzColor ColorOn( VzColor )

These are methods for defining what the "Off" color will be and turning colors "On" (normal state) or "Off" (temporarily changed to the Off color)

Color Drawing Methods

VzColor BackColor()

Returns the current background color VzColor BackColor( VzNativeGC, VzColor )

VzColor ForeColor( VzNativeGC, VzColor )

Set the foreground and background color

Miscellaneous Methods static double ColorIntensity( VzColor )

Returns the greyscale intensity of a color static u_long ColorIndex( VzColor )

Returns the native color index of a color u_long OverlayMask() const

Returns the native mask for the overlay plane

VzNativeColorMap ColorMap()

Returns the native color map static void InDisplay(VzNativeDisplay);

Returns the native display in which the colors are defined

FILES

Vz/Vz.h Contains various Vz types and enumerations.

SEE ALSO

VzFunctionality(3),

VzObject(3),

VzDrawer(3),

NAME

VzColorSelector—An object to selectively encode colors

SYNOPSIS

```
#include <Vz/CSelect.h>
enum {
    VzAllBars = -1
};
class VzColorSelector:public VzBarLayout, public VzDrawer {
public:
    // constructor & destructor
    VzColorSelector(char const *name, VzNativeObject parent,
        VzColorSelectorOptions, int bars
    );
    ~VzColorSelector();
        // bar status
    int     BarOn(int bar_no)const;
    void    BarOn(int bar_no, int on, int count = 0
        // color management
    void    BarColors(int count, VzColor first);
    virtual VzColor    BarColor(int bar_no) const;
    VzColor            ColorBase() const;
    int     ColorCount() const;
        // number of bars
    int     BarCount(int new_count);
protected:
    // data-structures
    struct BarInfoStruct {
        char const   *label
        double       percentage;
    };
    // callback functions
        virtual void BarInfo(int bar_no, BarInfoStruct*
            const = 0;
        virtual void BarChanged(int bar_no, int on, int
            count = 0);
};
```

DESCRIPTION

VzColorSelector

A VzColorSelector is—a VzBarLayout and a VzDrawer for doing color-coding and selection. A color-range is divided evenly over the number of bars. Bars have a status of either "on" or "off." Buttons 1 and 2 turn bars "on" and "off," respectively; button 3 pops-up a menu.

Public Interface

Constructor

VzColorSelector( char const *name, VzNativeObject parent, VzColorSelectorOptions, int bars )

Creates a VzColorSelector with the given name and parent. VzColorSelectorOptions is a superset of VzLayoutOptions with the additional option of VzProportional which, if given, adds the menu item "proportional" to the pop-up menu. Additionally, one of the VzColorManager options of VzRainbow, VzEqualized, or VzGray may also be passed. If that is done, the color-selector will perform a VzColorManager::AllocColors() passing the given option. The remaining VzLayoutOptions are passed through to VzBarLayout.

Bar Status int BarOn( int bar_no ) const

Returns non-zero only if the color for the given bar index is on. Forces the status of the bar with the given index to be the value of the on argument; non-zero means "on." The number of forthcoming calls to BarOn() should be passed. The special value VzAllBars can be passed for the bar_no argument to indicate all the bars at once.

Color Management void BarColors( int count, VzColor first )

Sets the colors that the color-selector is to use. The colors must have been previously allocated in the system colormap via VzColorManager::AllocColors(). The argument first specifies the first color in the contiguous range. This function can be called at any time.

VzColor BarColor( int bar_no ) const

Returns the color of the given bar index.

VzColor ColorBase() const

Returns the base color that the color-selector is using.

int ColorCount() const

Returns the number of colors that the color-selector is using.

Number of Bars int BarCount( int new_count )

In addition to calling VzBarLayout::BarCount(), it also resets the color-selector so that all of the new bars will be "on."

Protected Interface

Data Structures

```
struct BarInfoStruct {
    char const   *label
    double       percentage;
};
```

A structure for holding information about how to draw a colored bar. The member label codes the label used for the bar; percentage codes how much of the colored-part of the bar should be drawn. This number is in the range [0.0,1.0].

Callback Functions virtual void BarInfo( int bar_no, BarInfoStruct* ) const=0

A pure virtual member-function. It is called for each bar that needs to be drawn. The bar index and a pointer to a BarInfoStruct is passed. There is no default value for label so it must be set; the default value for percentage is 1.0. When overridden, the derived class changes values in the pointed-to BarInfoStruct to control how bars are drawn.

virtual void BarChanged( int bar_no, int on, int count=0 )

Called whenever the status of a bar changes from "on" to "off" and vice-versa.

The bar index and new status are passed. Additionally, the number of forthcoming calls to BarChanged() is also passed. The default action is to do nothing.

FILES

Vz/Vz.h Contains various Vz types and enumerations.

NAME

VzDrawer—Adds generic drawing ability

SYNOPSIS

```
#include <Vz/drawer.h>
class VzDrawer:public VzColorManager {
public:
    enum EngineType {GLEngine = 0, XEngine = 1,
        DynamicEngine = 1};
    // Constructor
    VzDrawer(EngineType what = DynamicEngine);
    // To output this as postscript
    void Postscript();
    static void FinishedPS();
    // Buffering routines
    inline void BeginBuffer(int x = 0, int y = 0,
        int width = 0, int height = 0)
    inline void EndBuffer()
    // Coordinate routines
    inline void UserCoord(double xmin, double xmax,
        double ymin, double ymax)
    inline int XUtoS(double x)
    inline int YUtoS( double y)
    inline int XscaleUtoS(double x)
    inline int YscaleUtoS(double y)
    inline double XStoU long x)
    inline double YStoU(long y)
    inline double XscaleStoU(long x)
    inline double YscaleStoU(long y)
    // Parameter setting routines
    inline void Clear(VzColor c = -99)
    inline void ForeColor(VzColor c)
    inline void BackColor(VzColor c)
    inline VzColor BackColor()
    inline void LineWidth(int wid)
    inline int SetFont(char const *charset)
    // Font information routines
    inline int MeasureString(const char *txt)
    inline int FontHeight() const
    inline int FontHeight(int *ascent, int *descent) const
    // Drawing routines
    inline void DrawPoint(int x, int y)
    inline void DrawPoint(double x, double y)
    inline void DrawLine (int x1, int y1, int x2, int y2)
    inline void DrawLine (double x2, double y1, double x2,
        double y2)
    inline void FrameRect(int x, int y, int width, int height)
    inline void FrameRect(double x, double y, double width,
        double height)
    inline void FillRect(int x, int y, int width, int height)
    inline void FillRect(double x, double y, double width,
        double height)
    inline void FrameOval(int x, int y, int width, int height)
    inline void FrameOval(double x, double y, double width,
        double height)
    inline void FillOval(int x, int y, int width, int height)
    inline void FillOval (double x, double y, double width,
        double height)
    inline void FramePoly(int n, int* x, int *y)
    inline void FramePoly(int n, double* x, double *y)
    inline void FillPoly (int n, int* x, int *y)
    inline void FillPoly (int n, double* x, double *y)
    inline void DrawString(int x, int y, char const *text,
    VzDrawOptions opt = VzDrawLeft)
    inline void DrawString(double x, double y, char const
    *text, VzDrawOptions opt = VzDrawl
    inline void DrawRotString(int x, int y, char const *text,
    int ang)
    inline void DrawRotString(double x, double y, char const
    *text, int ang)
    // Define squares and circles
    inline void FrameSquare(int x, int y, int side)
    inline void FrameSquare(double x, double y, double side)
    inline void FillSquare(int x, int y, int side)
    inline void FillSquare(double x, double y, double side)
    inline void FrameSquareCentred(int x, int y, int rad)
    inline void FrameSquareCentred(double x, double y,
        double rad)
    inline void FillSquareCentred(int x, int y, int rad)
```

-continued

SYNOPSIS

```
        inline void FillSquareCentred(double x, double y, double
            rad)
        inline void FrameCircle(int x, int y, int side)
        inline void FrameCircle(double x, double y, double side)
        inline void FillCircle(int x, int y, int side)
        inline void FillCircle(double x, double y, double side)
        inline void FrameCircleCentred(int x, int y, int rad)
        inline void FrameCircleCentred(double x, double y,
            double rad)
        inline void FillCircleCentred(int x, int y, int rad)
        inline void FillCircleCentred(double x, double y,
            double rad)
};
```

DESCRIPTION

VzDrawer

A VzDrawer is a VzColorManager and therefore also a VzFunctionality that gives a choice of simple generic drawing commands. Inheriting from this class gives the class access to drawing routines which produce GL, X, Windows or Postscript output and a choice of coordinate systems.

Constructor
VzDrawer(Engine Type what=DynamicEngine)

The constructor takes the type of drawing environment into which it will draw as a parameter. The default method dynamically chooses the most appropriate engine on construction Postscript support
void Postscript()
static void FinishedPS()

Postscript() sets up a file and writes a postscript description of the object into it. Subsequent calls to Postscript() add to the same file until any object calls its FinishedPS() method, which closes the file.

Buffering output
inline void BeginBuffer(int x=0, int y=0, int width=0, int height=0
inline void EndBuffer()

Bracketing drawing code with these calls allows double-buffering for the display.

Coordinate system methods
inline void UserCoord(double xmin, double xmax, double ymin, double ymax)

Sets up a coordinate system where the physical display area maps to the floating point virtual coordinate system defined by the arguments
inline int XUtoS( double x )
inline int YUtoS( double y )
inline int XscaleUtoS(double x )
inline int YscaleUtoS(double y )
inline double XStoU( long x )
inline double YStoU( long y )
inline double XscaleStoU( long x )
inline double YscaleStoU( long y )

These methods allow conversion between coordinate systems

General methods
inline void Clear(VzColor c=-99)

Clears the display area to the background color
inline void ForeColor(VzColor c)
inline void BackColor(VzColor c)

Sets the foreground and background drawing colors
inline VzColor BackColor()

Returns the background color inline void Line Width(int wid)
    Sets the width of lines for subsequent commands
inline int SetFont(char const *charset)
    Sets the font for future text display
    Font information methods
inline int MeasureString(const char *txt)
    Measures the width of a character string in pixels
inline int FontHeight() const
inline int FontHeight(int *ascent, int *descent) const
    Return characteristics of the given font
    Other routines
Frame Xxxxx(int...)
Frame Xxxxx(int...)
Fill Xxxxx(double...])
Fill Xxxxx(double...])

The remaining methods draw into the current object. They draw either the frame or a filled shape and use either the pixel-based or floating valued coordinate systems. There are therefore ususally four routines for each drawing command.

FILES

Vz/Vz.h Contains various Vz types and enumerations.
abort(3),
VzObject(3),
VzFunctionality(3),
VzColorManager(3)

NAME

VzDrawingArea—An object to draw into

SYNOPSIS

```
#include <Vz/DrawA.h>
class VzDrawingArea:public VzObject {
public:
    // constructors
    VzDrawingArea(char const *name, VzNativeObject parent,
        int collect_exposures = 1);
    VzDrawingArea(VzNativeObject self, int
        collect_exposures = 1);
    // expose & resize events
    virtual void    DoExpose(int left, int top, int width, int
                        height) = 0;
    virtual void    DoResize();
    // clearing & exposure
    VzDrawingArea&  ClearMe(int left, int top, int width, int
                        height);
    VzDrawingArea&  ClearMe();
    VzDrawingArea&  ExposeMe(int left, int top, int width, int
                        height);
    VzDrawingArea&  ExposeMe();
    VzDrawingArea&  ClearAndExposeMe(int left, int top, int
                        width, int height);
    // miscellany
    int  CollectExposures() const;
    int  CollectExposures(int collect);
};
```

DESCRIPTION

VzDrawingArea

A VzDrawingArea is—a VzObject for drawing into. Drawing occurs and should only occur as the result of a region being "exposed" to view via an expose event.

Constructors
VzDrawingArea( char const *name, VzNativeObject parent, int collect_exposures=1)

Creates a VzDrawingArea with the given name and parent native object. The argument collect_exposures determines whether the VzDrawingArea collects multiple exposure events and coalesces them into the smallest rectangle that encloses them all. This feature is almost always desired.
VzDrawingArea( VzNativeObject self, int collect_exposures=1 )

An alternate constructor for wrapping a VzDrawingArea around an already-constructed native object. This is a means to wrap a VzDrawingArea around different kinds of native objects. In the Silicon Graphics implementation of the Vz library, this constructor is used by the VzGLDrawingArea class.

Expose and Resize Events
virtual void DoExpose( int left, int top, int width, int height )=0

A pure virtual member-function. It is called when a region of the VzDrawingArea needs to be redrawn. The rectangle passed frames the region. It is harmless to draw outside of the rectangle's bounds.
virtual void DoResize()

This is called whenever the size of the VzDrawingArea (either width, height, or both) changes. The default action is to do nothing. Typically, if the scale of the drawing is supposed to change with the size of the VzDrawingArea, then this is overridden to call ExposeMe().

Clearing and Exposure
VzDrawingArea& ClearMe( int left, int top, int width, int height )
VzDrawingArea& ClearMe()

Clears either a portion or the entire VzDrawingArea to its background color.
VzDrawingArea& ExposeMe( int left, int top, int width, int height )
VzDrawingArea& ExposeMe()

Generates an expose event for either a portion or the entire VzDrawingArea. This is the way to force part or all of a VzDrawingArea to be redrawn. Never draw directly to a VzDrawingArea without having received an expose event for it.

Miscellany
int CollectExposures() const
int CollectExposures( int collect )

Gets and sets the status of the exposure-collection feature, respectively.

FILES

Vz/Vz.h Contains various Vz types and enumerations.

NAME

VzFunctionality—Base class for functionalities

SYNOPSIS

```
#include <Vz/Function.h>
class VzFunctionality }
protected:
    // data members
    VzObject *const possessor;
    // constructor
    VzFunctionality(VzObject*);
    // miscellaneous
    void assert_object () const;
};
```

DESCRIPTION

VzFunctionality

A VzFunctionality is the base class for all other functionality classes. All derived classes must use virtual inheritance. A functionality is a "method of interaction" with the user, the best examples of which are the mouse and keyboard. It is proper to say, "A particular VzObject has the functionality of being able to deal with the mouse," for example.

Data Members
VzObject *const possessor

A constant pointer to the VzObject that possesses one or more functionalities.

Constructor
VzFunctionality( VzObject* )

Initializes the possessor to be the given VzObject. Typically, argument passed is this. Due to the virtual inheritance, the most-derived class must always call this constructor; fortunately, a compile-time error results if the user forgets.

Miscellaneous
void assert_object() const

Checks to ensure that the possessor's native object exists. If not, it asserts with an error message and calls abort(). This can happen if the user derives a class from VzFunctionality or another functionality class derived therefrom before s/he derives from VzObject or a class derived therefrom. In C++, order of derivation with multiple-inheritance sometimes matters; this is one of those times. Unfortunately, this mistake can not be caught at compile-time. It is therefore up to derived functionality classes to call assert_object() if they need to get at the possessor's native object in their constructors.

FILES

Vz/Vz.h Contains various Vz types and enumerations.

NAME

VzGC—Graphics Context functionality

SYNOPSIS

```
#include <Vz/GC.h>
class GzGC:public virtual VzFunctionality {
protected:
    // data members
    VzNativeGC gc;
    // constructors & destructor
    GzGC();
    VzGC(VzNativeGC const&);
    VzGC(VzObject*);
    ~VzGC();
    // assignment
    VzGC& operator = ( VzNativeGC const&);
    // conversion
    operator VzNativeGC();
};
```

DESCRIPTION

VzGC

A VzGC is—a VzFunctionality for providing a native graphics context to the user derived class. A VzGC can also be a stand-alone object, however. The only benefit to using this class is that it ensures proper creation and destruction of a native graphics context.

Data Members
VzNativeGC gc

The VzNativeGC. The derived class, if any, inherits this data-member.

Constructors and Destructor

VzGC()

Default constructor. Creates a VzGC and a VzNativeGC.

VzGC( VzNativeGC const& )

Creates a VzGC and wraps it around the given VzNativeGC.

VzGC( VzObject* )

Creates a VzGC and a VzNativeGC and attaches them to the given VzObject. This is the constructor to be used to obtain a stand-alone VzGC.

~VzGC()

Destroys both the VzGC and the VzNativeGC.

Assignment

VzGC& operator=( VzNativeGC const& )

Destroys the current VzNativeGC and wraps itself around the given VzNativeGC.

Conversion operator VzNativeGC()

Conversion to a VzNativeGC. This allows a VzGC to be used wherever a VzNativeGC is expected.

FILES

Vz/Vz.h Contains various Vz types and enumerations.

NAME

VzGLDrawingArea—A Silicon Graphics object to draw into

SYNOPSIS

```
#include <Vz/GLDmwA.h>
class VzGLDrawingArea:public VzDrawingArea {
public:
    // constructors
    VzGLDrawingArea(char const *name, VzNativeObject
        parent, GLXconfig const* = 0, int collect_exposures = 1);
};
```

DESCRIPTION

VzGLDrawingArea

A VzGLDrawingArea is—a VzDrawingArea specialized for the Silicon Graphics implementation of the Vz library.

Constructors

VzGLDrawingArea( char const *name, VzNativeObject parent, GLXconfig const*=0, int collect_exposures=1 )

Creates a VzGLDrawingArea with the given name and parent native object. The GLXconfig const * argument is used to configure the Silicon Graphics native drawing area. The default value is:

{ GLX_NORMAL, GLX_DOUBLE, TRUE },
{ GLX_NORMAL, GLX_COLORMAP, TRUE },
{ GLX_NORMAL, GLX_ZSIZE, GLX_NOCONFIG },
{ 0,0,0 }

The first row controls double-buffering. If the Silicon Graphics workstation has too few bit planes, however, double-buffering is turned off.

FILES

Vz/Vz.h Contains various Vz types and enumerations.

SEE ALSO

VzDrawingArea(3).

NAME

VzKeyDispatcher—A functionality class for mapping keystrokes to actions

SYNOPSIS

```
#include <Vz/KeyDisp.h>
template<class Derived>class VzKeyDispatcher: public
VzKeyable {
protected:
    // local types
    typedef void (Derived::*KeyHandler)();
    // constructor
    VzKeyDispatcher(KeyHandler default_handler);
    // key mapping
    void MapKey(u_int ch, KeyHandler, int ignore_case = 0);
    void MapKey(u_int from, u_int to, KeyHandler, int
        ignore_case = 0);
    void MapKey(char const *keys, KeyHandler, int
        ignore_case = 0);
    void PushKeyMap(KeyHandler default_handler);
    void PopKeyMap();
};
```

DESCRIPTION

VzKeyDispatcher

A VzKeyDispatcher is—a VzKeyable for doing more sophisticated keyboard handling. Specifically, it allows keys to be mapped to member-functions. Whenever a key is pressed, the member-function it is mapped to is called. The derived class passes its own name for the template parameter Derived.

Local Types typedef void (Derived::*KeyHandler)()

The type KeyHandler is a "pointer to a member-function of the Derived class having no arguments nor return-type." Member-functions of the Derived class must have this signature to have keys mapped to them.

Constructor

VzKeyDispatcher( KeyHandler default_handler )

Creates a VzKeyDispatcher. Initially maps all keys to the given KeyHandler.

Key Mapping void MapKey( u_int ch, KeyHandler, int ignore_case=0 )

void MapKey( u_int from, u_int to, KeyHandler, int ignore_case=0 )

void MapKey( char const *keys, KeyHandler, int ignore_case=0 )

Maps either a single character ch, the range of characters [from,to], or the set of characters keys to the given KeyHandler. If ignore_case is non-zero, both upper- and lower-case characters are mapped simultaneously.

void PushKeyMap( KeyHandler default_handler )

Pushes the current set of key-mappings onto an internal stack and makes the current set of key-mappings the given one. This is useful for having "modal" keyboard interactions.

void PopKeyMap()

Pops off and discards the current set of key-mappings restoring the older set from the internal stack. A run-time error will result if the stack is empty.

FILES

Vz/Vz.h Contains various Vz types and enumerations.

SEE ALSO

VzKeyable(3).

NAME

VzKeyable—A functionality class for interacting with the keyboard

SYNOPSIS

```
#include <Vz/Key.h>
enum {
    VzUpKey =/*some number >= 128 */,.
    VzDownKey,
    VzLeftKey,
    VzRightKey,
    VzHomeKey,
    VzEndKey,
    VzPageUpKey,
    VzPageDownKey,
    VzBreakKey,
    VzHelpKey,
    VzInsertKey,
    VzNumLockKey,
    VzPauseKey,
    VzPrintKey,
    VzScrollLockKey,
    VzSysRequestKey,
    VzUndoKey,
    VzUndefinedKey
};
class VzKeyable:public virtual VzFunctionality {
protected:
    // constructor & destructor
    VzKeyable(VzKeyActions = VzDown);
    ~VzKeyable();
    // current key
    u_char  Key() const;
    // callback function
    virtual void DoKey(VzKeyActions, VzNativeEvent const*);
    // miscellaneous
    VzKeyActionsKeyActions() const;
    VzKeyActionsKeyActions(VzKeyActions);
};
```

DESCRIPTION

VzKeyable

A VzKeyable is—a VzFunctionality for interacting with the keyboard.

Constructor and Destructor
VzKeyable( VzKeyActions=VzDown )

Requests the given key actions to be reported via DoKey(). The VzKeyActions, which are bitwise-or'd together, are:

VzDown Any key pressed.

VzUp Any key released.

VzAll All of the above.
~VzKeyable()
Nothing noteworthy.
Key State
int Key() const Returns the last (not current) key that was pressed or released. Either an ASCII code or one of the special enumerations listed above is returned.

Callback Function
virtual void DoKey( VzKeyActions, VzNativeEvent const* )

Called when any one of the selected VzKeyActions occurs. The default action is to do nothing. The actual VzKeyAction is passed. Additionally, a pointer to the triggering VzNativeEvent is also passed.

Miscellaneous
VzKeyActions KeyActions() const
VzKeyActions KeyActions( VzKeyActions )

Gets and sets the current VzKeyActions overriding any previous setting, respectively.

FILES

Vz/Vz.h Contains various Vz types and enumerations.

SEE ALSO

VzFunctionality(3).

NAME

VzMouseable—A functionality class for interacting with the mouse

SYNOPSIS

```
#include <Vz/Mouse.h>
class VzMouseable:public virtual VzFunctionality {
protected:
    // constructor & destructor
    VzMouseable(VzMouseActions);
    ~VzMouseable();
    // mouse state
    int     MouseX() const;
    int     MouseY() const;
    int     Mouse(int button) const;
    void    UpdateMouse();
    // callback function
    virtual void    DoMouse(VzMouseActions, int button,
                        VzNativeEvent const*);
    // miscellaneous
    VzMouseActions      MouseActions() const;
    VzMouseActions      MouseActions(VzMouseActions);
};
```

DESCRIPTION

VzMouseable

A VzMouseable is—a VzFunctionality for interacting with the mouse.

Constructor and Destructor
VzMouseable( VzMouseActions )

Requests the given mouse actions to be reported via DoMouse(). The VzMouseActions, which are bitwise-or'd together, are:

VzMotion All mouse motion.

VzDown Any button pressed.

VzDrag All mouse motion with any button down.

VzUp Any button up.

VzAll All of the above.

VzLeave Reports the last instant when the mouse was within the borders of the possessor VzObject and has since left.

VzHints Speeds motion and drag events by not reporting every tiny motion.

If both VzDown and VzUp are selected, it is assumed that mouse down/up events are desired in pairs. In this case, it is guaranteed that for a down event, the matching up event will be reported. It does this by "grabbing" the mouse pointer on the down event and constrains it to remain within the borders of the possessor object until the mouse button is released. If only either VzDown or VzUp is selected, no special mouse-event processing takes place.

˜VzMouseable()
  Nothing noteworthy.
  Mouse State
int MouseX() const
int MouseY() const
int Mouse( int button ) const
  Returns the last (not current) location or button status of the mouse. Button numbers are in the range [1,5]. Non-zero means "down."
void UpdateMouse()
  Updates the status of the mouse to reflect it at the time of the call.
  Callback Function
virtual void DoMouse( VzMouseActions, int button, VzNativeEvent const* )
  Called when any one of the selected VzMouseActions occurs. The default action is to do nothing. The actual VzMouseAction and button are passed. If the VzAction does not involve a button, the button argument is zero. Additionally, a pointer to the triggering VzNativeEvent is also passed. In at least the X-Windows/OSF-Motif implementation of the Vz library, this is needed to pop-up a menu with button 3.
  Miscellaneous
VzMouseActions MouseActions() const
VzMouseActions MouseActions( VzMouseActions )
  Gets and sets the current VzMouseActions overriding any previous setting, respectively.

FILES

Vz/Vz.h Contains various Vz types and enumerations.

SEE ALSO

VzFunctionality(3).

NAME

VzNative*—Underlying graphics system native types

SYNOPSIS

```
#include <Vz/Native.h>
typedef/* ... */VzNativeColorMap;
typedef/* ... */VzNativeContext;
typedef/* ... */VzNativeDisplay;
typedef/* ... */VzNativeEvent;
typedef/* ... */VzNativeGC;
typedef/* ... */VzNativeObject;
typedef/* ... */VzNativeWindow;
```

DESCRIPTION

This header defines Vz equivalents for several native underlying graphics system types. The hope is to "hide" the underlying types from the rest of the Vz library and from the user.
  Types
VzNativeColorMap
  The native color-map.
VzNativeContext
  The native "application context."
VzNativeDisplay
  The native "display." This corresponds to the physical monitor.
VzNativeEvent
  The native event, a data-structure to hold the information associated with the occurrence of some event from "out there."
VzNativeGC
  The native "graphics context," a data-structure to hold the graphics environment settings like: the drawing color, line width, etc.
VzNativeObject
  The native graphical object. For example, in the X-Windows implementation of the Vz library, this maps to the type Widget.
VzNativeWindow
  The native "window." This is the native object that corresponds to the rectangle on the display into which it draw itself. For example, in the X-Windows implementation of the Vz library, this maps to the type Window.

NAME

VzObject—Underlying graphics system object wrapper

SYNOPSIS

```
#include <Vz/Object.h>
enum {
    VzDeleteWithWindow =/* some non-zero number */
};
class VzObject {
public:
    // data members
    VzNativeObject const object;
    // dynamic allocation
    void*     operator new(size_t, int delete_with_window);
    void*     operator new(size_t
    void      operator delete(void*);
    // display & window
    VzNativeDisplay   MyDisplay() const;
    VzNativeWindow    MyWindow() const;
    // get at C++ object
    static VzObject*  This( VzNativeObject);
    // width & height
    virtual int       Width() const;
    virtual VzObject& Width(int);
    virtual int       Height() const;
    virtual VzObject& Height(int);
    // ancestry
    VzNativeObject    Parent() const;
    static VzNativeObjectTop( VzNativeObject);
    VzNativeObject    Top() const;
protected:
    // constructor & destructor
    VzObject( VzNativeObject);
    virtual ˜VzObject();
    // window creation & destruction
    virtual void  OnWindowCreate();
    virtual void  OnWindowDestroy();
    virtual void  VzWindowCreate();
    virtual void  VzWindowDestroy();
};
// macros
#define VzCAST(T,native) (T*)VzObject::This(native)
```

DESCRIPTION

VzObject
  A VzObject is used to "wrap" a C++ object around a native windowing environment graphical object.
  Public Interface
  Data Members
VzNativeObject const object The native object around which the VzObject is wrapped. Since it is constant, it can be public.

Dynamic Allocation void* operator new( size_t, int delete_with_window )

If an instance of a VzObject or any class derived therefrom is dynamically allocated with this operator new using the argument VzDeleteWithWindow via the placement syntax form, then if the native window and object are destroyed, this VzObject wrapped around it will also be destroyed. This implies that externally-maintained pointers to this VzObject can become invalid at any time so such pointers should not be used. Instead, the derived class should also be derived from a class like Registrant or Subscriber. This way, the VzObject under destruction will properly deregister itself.

void* operator new( size_t )

Ordinary dynamic allocation. If this operator new is used to dynamically create an instance of VzObject or any class derived therefrom, then that instance will not be destroyed if the native window and object are destroyed. Instead, MyWindow() will return "no window" from that point on.

void operator delete( void* )

This operator is supplied only to get rid of a compiler warning. It just calls the global operator delete.

Display & Window
VzNativeDisplay MyDisplay() const
VzNativeWindow MyWindow() const Returns the display or window, respectively. The window may not always be valid. It is not valid before VzWindowCreate() and OnWindowCreate() have been called.

Get at C++ Object
static VzObject* This( VzNativeObject )

Returns a pointer to the VzObject wrapped around the given native object. The native object must have a valid VzObject wrapped around it, otherwise the result is undefined.

Width & Height
virtual int Width() const
virtual VzObject& Width( int )
virtual int Height() const
virtual VzObject& Height( int )

Get and set the width and height, respectively. The fact that these functions are virtual is deprecated and may be made unvirtual in the future.

Ancestry
VzNativeObject Parent() const

Returns the native parent object.

static VzNativeObject Top( VzNativeObject )

Returns the native top-most object of the given native object.

VzNativeObject Top() const

Returns the native top-most object of this VzObject.

Protected Interface
Constructor and Descructor
VzObject( VzNativeObject )

Creates an instance of a VzObject and wraps it around the given native object.

virtual ~VzObject();

Destroys an instance of a VzObject. It also destroys the native object around which it is wrapped.

Window Creation & Destruction
virtual void On WindowCreate()

Called when the native window is created which is always later than the VzObject instance's construction. The default action is to do nothing.

virtual void On WindowDestroy()

Called only when the native window is destroyed by the software user, i.e., s/he destroys a window via the window manager. It is not called if the VzObject is destroyed by the programmer, i.e., via operator delete, because s/he knows it's being destroyed. The default action is to do nothing.

virtual void VzWindowCreate()
virtual void VzWindowDestroy()

These two functions are for the sole use of the Vz library and should not be overridden by an end-user. They behave exactly as OnWindowCreate() and OnWindowDestroy(). These are called before those.

Macros
define VzCAST(T,native)((T*)VzObject::This(native))

Casts VzObject::This(), given the native object, to a pointer to the type T.

FILES

Vz/Vz.h Contains various Vz types and enumerations.

SEE ALSO

Registry(3), Publication(3).

NAME

VzTextArea—An object that draws lines of text

SYNOPSIS

```
#include <Vz/TextA.h>
class VzTextArea: public VzDrawingArea, public VzDrawer {
public:
    // constructor & destructor
    VzTextArea(char const *name, VzNativeObject parent, int
        scrollable, int left_margin = 0);
    ~VzTextArea();
    // fonts
    void    MountFont(int slot, char const *font_name);
    // text
    void        Text(char const*, long char_count =
                LONG_MAX);
    void        Text(Vector<char const*>const&);
    char const* TextAt(int line_no) const;
    // text position
    VzTextArea& TopLine(int line_no);
    VzTextArea& ShowLine(int line_no, int always_center = 0);
    // highlighting
    VzTextArea& HighlightLine(int line_no, int yes);
    // miscellany
    int     LineCount() const;
    int     LineHeight(int *ascent = 0, int *descent = 0) const;
    int     LinesShowing(int partial = 0) const;
    int     TopLine() const;
    int     BottomLine() const;
    int     IsLineShowing(int line_no const;
protected:
    // data-structures
    struct LineInfoStruct {
        VzColor color;
        short font;
    };
    // callback function
    virtual void LineInfo(int line_no, LineInfoStruct*) const;
    // data members
    VzColor const black, white;
};
class VzTextAreaIterator:public
VectorConstIterator<char const*>{
    // constructor
    VzTextAreaIterator(VzTextArea const&, int first_index = 0,
        int reverse = 0);
};
```

DESCRIPTION

VzTextArea
Public Interface

A VzTextArea is—a VzDrawingArea and a VzDrawer that draws lines of optionally scrolling text. Lines of text can be colored, highlighted, and drawn in different fonts, individually and independently. The height of the lines is the height of the largest font. Line numbers start at zero. The default appearance of lines is white, unhighlighted, and in the font non12.

Constructor and Destructor
VzTextArea( char const *name, VzNativeObject parent, int scrollable, int left_margin=0 )
Creates a VzTextArea with the given name and parent native object. The argument scrollable determines whether the VzTextArea has a scrollbar to its right. The argument left_margin determines how many pixels from the left-hand-side of the drawing area each line is indented.
~VzTextArea()
Nothing noteworthy.
Fonts
void MountFont( int slot, char const *font_name )
A VzTextArea has 16 font "slots" into which fonts can be "mounted." Slot numbers are [0,15]. Initially, all slots are mounted with the font non12. When called, MountFont() recomputes the largest line height and line descent, then calls ExposeMe().
Text
char const* Text( char const*, long char_count=LONG_MAX )
Sets the text to be drawn. A pointer to the start of a contiguous block of text is passed. The text is considered to extend until either a null character is encountered or for the given number of characters. Internally, this block of text is broken down into lines; lines are taken to be newline terminated.
char const* Text( Vector<char const*>const& )
Sets the text to be drawn. Pointers to the start of each line are passed via the argument.
Line Access
char const* TextAt( int line_no ) const
Returns a pointer to the specified line of text.
Text Position
VzTextArea& Topline( int line_no )
Makes the given line the top line unless that would leave "blank" lines toward the bottom. In that case, the top line number becomes LineCount()—LinesShowing().
VzTextArea& ShowLine( int line_no, always_center=0 )
If the specified line is not within the current range of lines being displayed, or the always_center argument is non-zero, the line is drawn centered in the drawing area; otherwise, ShowLine() does nothing.
Highlighting
VzTextArea& HighlightLine( int line_no, int yes )
Sets the highlighting of the specified line to the value of the yes argument: non-zero means highlighted.
Miscellany
int LineCount() const
Returns the number of lines.
int LineHeight( int *ascent=0, int *descent=0 ) const
Returns VzDrawer::FontHeight() ×1.2. The arguments are the same as for FontHeight().
int LinesShowing( int partial=0 ) const
Returns the number of lines are completely or partially being displayed within the drawing area, depending on the argument.
int TopLine() const
int BottomLine() const
Returns either the line number at the top or the bottom of the drawing area, respectively.

int IsLineShowing( int line_no ) const
Returns non-zero if the specified line is within the range of lines being displayed.
Protected Interface
Data Structures ---
struct LineInfoStruct {
    VzColor   color;
    short   font;
};
---

A structure for holding information about how to draw a line of text. The member color codes the color of the line; font codes the font slot.
virtual void LineInfo( int line_no, LineInfoStruct* ) const
Called for each line that needs to be drawn. The line number and a pointer to a LineInfoStruct is passed. The default value for color is white; for font, 0. If overridden, the derived class changes values in the pointed-to LineInfoStruct to control how lines of text are drawn. The default action is to do nothing.
Data Members
VzColor const black, white
The VzColors black and white.
VzTextAreaIterator
A VzTextAreaIterator is—an VectorConstIterator<char const*> that, given a VzTextArea, will iterate over its lines of text.
Constructor
VzTextAreaIterator( VzTextArea const&, int first_index=0, int reverse=0 )
Creates a VzTextAreaIterator on the given VzTextArea that will start iterating at the zeroth or given element in the specified direction.

FILES

Vz/Vz.h Contains various Vz types and enumerations.

SEE ALSO

Vector(3), VzDrawer(3), VzDrawingArea(3).
Conclusion
The foregoing Detailed Description has disclosed to those skilled in the art of programming using object-oriented programming systems how a class library may be constructed in which the classes are partitioned into entity classes, which specify entities represented by objects whose classes inherit an entity class, and functionality classes, which can be inherited by objects whose classes inherit entity classes and which specify functionalities available to those objects. In the preferred embodiment, any object which inherits any of the entity classes may inherit any of the functionality classes.

Class libraries with narrowly-defined functionality classes and entity classes permit programmers using the class library to precisely define the properties of the entity represented by an object and to provide the object with only those functionalities required by the object. By using such class libraries instead of prior-art class libraries, programmers are able to develop programs more quickly. Moreover, the resulting programs are precisely adapted to the problem at hand and are both smaller and faster than programs developed using prior-art class libraries.

The Detailed Description has also shown in detail how the principles described above have been embodied in the Vz library of classes for data visualization programs and how the Vz library may be used to specify object classes in an example graphics program. In that library, the entity classes are embodied in area classes, which are inherited by objects which represent areas in a display. The functionality classes provide the objects defined by the area classes with the capability of responding to particular inputs. Functionality classes of particular interest in the Vz library include the VzMouseable class for making an area of the screen responsive to inputs from the mouse, the VzKeyable class for making the area responsive to inputs from the keyboard, and the VzDrawer class, which makes the area responsive to drawing commands.

While the Vz library is implemented in the C++ language and is intended for use in data visualization programs, it will be apparent from the foregoing that the principles embodied in that library may be used in other libraries for data visualization and other problem areas and that libraries embodying the principles may be implemented in languages other than C++. In particular, the principles of the invention are applicable not only to programming systems employing compilation, but also to those employing interpretation. Moreover, those skilled in the art will immediately see that other classes can be added to the Vz library and that other implementations of the existing classes are possible.

All of the above being the case, the foregoing Detailed Description is to be understood as being in all cases illustrative and exemplary, but not restrictive, and the scope of the inventions is determined not by the Detailed Description, but rather by the attached claims as interpreted in accordance with the full breadth permitted by the patent laws.

What is claimed is:

1. A library of class specifications for use in a programming system of a type which specifies objects and classes therefor and which permits class specification by multiple inheritance, the programming system being implemented in a computer system, the library being readable by the programming system, and the library comprising:

a first class specification for a first entity class which specifies an entity which is represented by an object and a second class specification for a functionality class which specifies an additional functionality for an object which is an entity of the first entity class, the functionality class being inheritable by a second entity class which also inherits the first entity class, whereby the second entity class may be used in the programming system to specify an object which is an entity of the first entity class and has the additional functionality.

2. The library set forth in claim 1 further comprising:

a plurality of the first class specifications for a plurality of the first entity classes and a plurality of the second class specifications for a plurality of the functionality classes.

3. The library set forth in claim 2 wherein:

each of the functionality classes is inheritable together with any of the entity classes.

4. The library set forth in claim 2 wherein:

the objects which are of the the entity classes represent areas in a display and the functionality classes specify individual functionalities which the areas may additionally have.

5. The library set forth in claim 4 wherein:

The functionality classes include a mouseable class which specifies the functionality of responding to an input from a pointing device, a keyable class which specifies the functionality of responding to an input from a keyboard, and a draw class which specifies the functionality of responding to drawing commands.

6. The library set forth in claim 4 wherein:

each of the functionality classes is inheritable together with any of the entity classes.

7. The library set forth in claim 1 wherein:

the entity represented by the object is an area in a display and the functionality class specifies an additional functionality in the area.

8. The library set forth in claim 7 wherein:

the functionality class specifies that the area is additionally responsive to an input from a pointing device.

9. The library set forth in claim 7 wherein:

the functionality class specifies that the area is additionally responsive to an input from a keyboard.

10. The library set forth in claim 7 wherein:

the functionality class specifies that the area is additionally capable of responding to drawing commands.

11. A storage medium which is readable by the computer system, the storage medium being characterized in that:

the storage medium contains the library of class specifications of any of claims 1 through 10.

12. A method of employing a programming system to generate code for a program, the programming system being implemented in a computer system and being of a type which specifies objects and classes therefor and permits class specification by multiple inheritance and the code being executable in that or another computer system, the method comprising the steps performed by the programming system of:

receiving a specification of an object which is of a class which multiply inherits an entity class and a functionality class specified in a library of class specifications which is readable by the programming system, the library of class specifications including a first class specification for the entity class, the entity class specifying an entity which is represented by an object and a second class specification for the functionality class, the functionality class specifying an additional functionality for an object whose class inherits the entity class;

receiving a specification of the object's class; and employing code generating means in the programming system to generate the code using the first class specification, the second class specification, the object's class specification, and the specification for the object.

* * * * *